United States Patent
Goswami et al.

(10) Patent No.: US 10,911,546 B1
(45) Date of Patent: Feb. 2, 2021

(54) ROBOTIC PROCESS AUTOMATION WITH AUTOMATED USER LOGIN FOR MULTIPLE TERMINAL SERVER HOSTED USER SESSIONS

(71) Applicant: Automation Anywhere, Inc., San Jose, CA (US)

(72) Inventors: Jitendrapuri Mahendrapuri Goswami, Vadodara (IN); Mahendra Gajera, Vadodara (IN); Ankit Raval, Vadodara (IN); Prakash Gajera, Vadodara (IN)

(73) Assignee: Automation Anywhere, Inc., San Jose, CA (US)

( * ) Notice: Subject to any disclaimer, the term of this patent is extended or adjusted under 35 U.S.C. 154(b) by 0 days.

(21) Appl. No.: 16/730,905

(22) Filed: Dec. 30, 2019

(51) Int. Cl.
*H04L 29/08* (2006.01)
*G06F 9/451* (2018.01)

(52) U.S. Cl.
CPC ............ *H04L 67/141* (2013.01); *G06F 9/452* (2018.02)

(58) Field of Classification Search
None
See application file for complete search history.

(56) References Cited

U.S. PATENT DOCUMENTS

| | | |
|---|---|---|
| 5,949,999 A | 9/1999 | Song et al. |
| 5,983,001 A | 11/1999 | Boughner et al. |
| 6,133,917 A | 10/2000 | Feigner et al. |
| 6,389,592 B1 | 5/2002 | Ayres et al. |
| 6,427,234 B1 | 7/2002 | Chambers et al. |
| 6,473,794 B1 | 10/2002 | Guheen et al. |
| 6,496,979 B1 | 12/2002 | Chen et al. |
| 6,640,244 B1 | 10/2003 | Bowman-Amuah |
| 6,704,873 B1 | 3/2004 | Underwood |
| 6,898,764 B2 | 5/2005 | Kemp |
| 6,954,747 B1 | 10/2005 | Wang et al. |
| 6,957,186 B1 | 10/2005 | Guheen et al. |

(Continued)

OTHER PUBLICATIONS

Al Sallami, Load Balancing in Green Cloud Computation, Proceedings of the World Congress on Engineering 2013 vol. II, WCE 2013, 2013, pp. 1-5 (Year: 2013).

(Continued)

*Primary Examiner* — Lance Leonard Barry
(74) *Attorney, Agent, or Firm* — Appleton Luff (57) ABSTRACT

A robotic process automation system processes task processing instructions which are operable to interact at a user level with user level application programs to process work items. A first server processor responds to a request to perform an automation task to automatically process without human user input, a work item by transmitting requests to an autologin program executing on a second server processor device to initiate a plurality of remote desktop protocol oriented processes within an operating system executing on the second server, where the remote desktop protocol oriented processes provide a graphical user interface to an authorized user. Credentials for the authorized users of the remote desktop protocol oriented processes are provided by one or more of the plurality of sets of task processing instructions, which upon logging into the corresponding remote desktop protocol oriented process, process the work items as encoded in the task processing instructions.

18 Claims, 5 Drawing Sheets

(56) References Cited

U.S. PATENT DOCUMENTS

| | | | |
|---|---|---|---|
| 7,091,898 | B2 | 8/2006 | Arling et al. |
| 7,246,128 | B2 | 7/2007 | Jordahl |
| 7,398,469 | B2 | 7/2008 | Kisamore et al. |
| 7,441,007 | B1 | 10/2008 | Kirkpatrick et al. |
| 7,533,096 | B2 | 5/2009 | Rice et al. |
| 7,568,109 | B2 | 7/2009 | Powell et al. |
| 7,571,427 | B2 | 8/2009 | Wang et al. |
| 7,765,525 | B1 | 7/2010 | Davidson et al. |
| 7,805,317 | B2 | 9/2010 | Khan et al. |
| 7,805,710 | B2 | 9/2010 | North |
| 7,810,070 | B2 | 10/2010 | Nasuti et al. |
| 7,846,023 | B2 | 12/2010 | Evans et al. |
| 8,028,269 | B2 | 9/2011 | Bhatia et al. |
| 8,056,092 | B2 | 11/2011 | Allen et al. |
| 8,095,910 | B2 | 1/2012 | Nathan et al. |
| 8,132,156 | B2 | 3/2012 | Malcolm |
| 8,209,738 | B2 | 6/2012 | Nicol et al. |
| 8,234,622 | B2 | 7/2012 | Meijer et al. |
| 8,245,215 | B2 | 8/2012 | Extra |
| 8,352,464 | B2 | 1/2013 | Fotev |
| 8,396,890 | B2 | 3/2013 | Lim |
| 8,438,558 | B1 | 5/2013 | Adams |
| 8,443,291 | B2 | 5/2013 | Ku et al. |
| 8,464,240 | B2 | 6/2013 | Fritsch et al. |
| 8,498,473 | B2 | 7/2013 | Chong et al. |
| 8,504,803 | B2 | 8/2013 | Shukla |
| 8,631,458 | B1 | 1/2014 | Banerjee |
| 8,682,083 | B2 | 3/2014 | Kumar et al. |
| 8,713,003 | B2 | 4/2014 | Fotev |
| 8,769,482 | B2 | 7/2014 | Batey et al. |
| 8,819,241 | B1 | 8/2014 | Washburn |
| 8,832,048 | B2 | 9/2014 | Lim |
| 8,874,685 | B1 | 10/2014 | Hollis et al. |
| 8,943,493 | B2 | 1/2015 | Schneider |
| 8,965,905 | B2 | 2/2015 | Ashmore et al. |
| 9,104,294 | B2 | 8/2015 | Forstall et al. |
| 9,213,625 | B1 | 12/2015 | Schrage |
| 9,278,284 | B2 | 3/2016 | Ruppert et al. |
| 9,444,844 | B2 | 9/2016 | Edery et al. |
| 9,462,042 | B2 | 10/2016 | Shukla et al. |
| 9,571,332 | B2 | 2/2017 | Subramaniam et al. |
| 9,621,584 | B1 | 4/2017 | Schmidt et al. |
| 9,946,233 | B2 | 4/2018 | Brun et al. |
| 10,733,329 | B1* | 8/2020 | Ragupathy ............... B25J 13/06 |
| 2003/0033590 | A1 | 2/2003 | Leherbauer |
| 2003/0101245 | A1 | 5/2003 | Srinivasan et al. |
| 2003/0159089 | A1 | 8/2003 | DiJoseph |
| 2004/0083472 | A1 | 4/2004 | Rao et al. |
| 2004/0172526 | A1 | 9/2004 | Tann et al. |
| 2004/0210885 | A1 | 10/2004 | Wang et al. |
| 2004/0243994 | A1 | 12/2004 | Nasu |
| 2005/0188357 | A1 | 8/2005 | Derks et al. |
| 2005/0204343 | A1 | 9/2005 | Kisamore et al. |
| 2005/0257214 | A1 | 11/2005 | Moshir et al. |
| 2006/0095276 | A1 | 5/2006 | Axelrod et al. |
| 2006/0150188 | A1 | 7/2006 | Roman et al. |
| 2007/0101291 | A1 | 5/2007 | Forstall et al. |
| 2007/0112574 | A1 | 5/2007 | Greene |
| 2007/0156677 | A1 | 7/2007 | Szabo |
| 2008/0005086 | A1 | 1/2008 | Moore |
| 2008/0027769 | A1 | 1/2008 | Eder |
| 2008/0028392 | A1 | 1/2008 | Chen et al. |
| 2008/0209392 | A1 | 8/2008 | Able et al. |
| 2008/0222454 | A1 | 9/2008 | Kelso |
| 2008/0263024 | A1 | 10/2008 | Landschaft et al. |
| 2009/0037509 | A1 | 2/2009 | Parekh et al. |
| 2009/0103769 | A1 | 4/2009 | Milov et al. |
| 2009/0172814 | A1 | 7/2009 | Khosravi et al. |
| 2009/0199160 | A1 | 8/2009 | Vaitheeswaran et al. |
| 2009/0217309 | A1 | 8/2009 | Grechanik et al. |
| 2009/0249297 | A1 | 10/2009 | Doshi et al. |
| 2009/0313229 | A1 | 12/2009 | Fellenstein et al. |
| 2009/0320002 | A1 | 12/2009 | Peri-Glass et al. |
| 2010/0023602 | A1 | 1/2010 | Martone |
| 2010/0023933 | A1 | 1/2010 | Bryant et al. |
| 2010/0100605 | A1 | 4/2010 | Allen et al. |
| 2010/0106671 | A1 | 4/2010 | Li et al. |
| 2010/0138015 | A1 | 6/2010 | Colombo et al. |
| 2010/0223558 | A1* | 9/2010 | Feng .................... H04L 63/083 |
| | | | 715/741 |
| 2010/0235433 | A1 | 9/2010 | Ansari et al. |
| 2011/0022578 | A1 | 1/2011 | Fotev |
| 2011/0145807 | A1 | 6/2011 | Molinie et al. |
| 2011/0197121 | A1 | 8/2011 | Kletter |
| 2011/0276568 | A1 | 11/2011 | Fotev |
| 2011/0276946 | A1 | 11/2011 | Pletter |
| 2011/0302570 | A1 | 12/2011 | Kurimilla et al. |
| 2012/0042281 | A1 | 2/2012 | Green |
| 2012/0124062 | A1 | 5/2012 | Macbeth et al. |
| 2012/0330940 | A1 | 12/2012 | Caire et al. |
| 2012/0331032 | A1* | 12/2012 | Balachandran ....... H04L 69/164 |
| | | | 709/202 |
| 2013/0067229 | A1* | 3/2013 | German ............. H04L 63/0815 |
| | | | 713/171 |
| 2013/0173648 | A1 | 7/2013 | Tan et al. |
| 2013/0290318 | A1 | 10/2013 | Shapira et al. |
| 2014/0181705 | A1 | 6/2014 | Hey et al. |
| 2015/0082280 | A1 | 3/2015 | Betak et al. |
| 2015/0347284 | A1 | 12/2015 | Hey et al. |
| 2016/0019049 | A1 | 1/2016 | Kakhandiki et al. |
| 2016/0078368 | A1 | 3/2016 | Kakhandiki et al. |
| 2017/0295243 | A1* | 10/2017 | Kim ........................ G06F 9/452 |
| 2018/0268337 | A1* | 9/2018 | Miller ............. G06Q 10/063114 |

OTHER PUBLICATIONS

B. P. Kasper "Remote: A Means of Remotely Controlling and Storing Data from a HAL Quadrupole Gas Analyzer Using an IBM-PC Compatible Computer", Nov. 15, 1995, Space and Environment Technology Center.

Bergen et al., RPC automation: making legacy code relevant, May 2013, 6 pages.

Hu et al., Automating GUI testing for Android applications, May 2011, 7 pages.

Konstantinou et al., An architecture for virtual solution composition and deployment in infrastructure clouds, 9 pages (Year: 2009).

Nyulas et al., An Ontology-Driven Framework for Deploying JADE Agent Systems, 5 pages (Year: 2008).

Tom Yeh, Tsung-Hsiang Chang, and Robert C. Miller, Sikuli: Using GUI Screenshots for Search and Automation, Oct. 4-7, 2009, 10 pages.

Yu et al., Deploying and managing Web services: issues, solutions, and directions, 36 pages (Year: 2008).

Zhifang et al., Test automation on mobile device, May 2010, 7 pages.

* cited by examiner

ROBOTIC PROCESS AUTOMATION WITH AUTOMATED USER LOGIN FOR MULTIPLE TERMINAL SERVER HOSTED USER SESSIONS

FIELD OF THE DISCLOSURE

This disclosure relates generally to the field of data processing systems and more particularly to robotic process automation systems.

BACKGROUND

Robotic process automation (RPA) is the application of technology that allows workers in an organization to configure computer software, known as a "robot" to capture and interpret existing applications for processing a transaction, manipulating data, triggering responses and communicating with other digital systems. The software robots in conventional RPA systems employ the software robots to interpret the user interface of third-party applications and to execute steps identically to a human user. For example, many tasks within organizations require individuals to perform the same repetitive tasks, such as entering data from invoices into an enterprise accounts payable application or entering data from a loan application into a loan processing system. RPA permits the automation of such application level repetitive tasks via software robots that are coded to repeatedly and accurately perform the repetitive task.

The software robots operate at an application level, as a human user would engage with such applications, so protection and use of the credentials that are required to authorize the software robots is critical. As RPA systems are being used to process ever larger sets of data, and as dependence on such systems grows, the need increases to simplify and to automate the deployment of software robots while ensuring the use of appropriate credentials are used to maintain system security.

In many data processing environments, a terminal server is employed to centrally host applications and resources and publish them to remote client devices, regardless of the location and platform of the end user device. This permits remote access of an application that may not otherwise be designed to be remotely accessed. Moreover, the central deployment of an application simplifies the installation and update of the application. This also provides cost benefits by reducing in some cases licensing costs of the application. It is desirable to deploy RPA on applications deployed via a terminal server. Current techniques for deploying RPA on applications deployed via a terminal server however do not permit enough automation to permit efficient RPA deployment in terminal server environments.

SUMMARY

In the embodiments disclosed herein, automatic login (auto login) into a user session may occur when the user session is being hosted by a terminal server and even in instances when multiple user sessions are being hosted by the terminal server on a single device. This permits logging into a user session automatically to permit automatic deployment and execution of bots in unattended mode in a multi-user terminal server environment, such as for example, environments Windows Terminal Servers like Windows Server 2008, 2012, 2016 available from Microsoft Corporation. Moreover, certain organizations require a user, either before logging in or after logging in, to agree to certain terms and conditions of use before using the organization's computing systems. In such an instance, the embodiments disclosed herein permit automated acceptance of such terms and conditions to permit automated logging in and deployment of bots to interact with the organizations applications and perform other tasks on the organizations computing systems as would a human user.

In one embodiment, a robotic process automation system includes data storage for storing a plurality of sets of task processing instructions where each set of task processing instructions is operable to interact at a user level with one or more designated user level application programs. The data storage also stores a plurality of work items, where each work item is stored for subsequent processing by executing a corresponding set of task processing instructions. A first server processor is operatively coupled to the data storage and is configured to execute instructions that when executed cause the first server processor to respond to a request to perform an automation task to automatically process without human user input, a work item from the plurality of work items, by, transmitting a first request to an autologin program which executes on a second server processor device to initiate a first remote desktop protocol oriented process within an operating system executing on the second server. The first remote desktop protocol oriented process provides a graphical user interface to an authorized user. The first server processor transmits a second request to the autologin program executing on the second server processor device to initiate a second remote desktop protocol oriented process, that executes concurrently with the first remote desktop protocol oriented process, within the operating system executing on the second server. The second remote desktop protocol oriented process provides a graphical user interface to an authorized user. Credentials for the authorized user of the first remote desktop protocol oriented process and for the authorized user of the first remote desktop protocol oriented process are provided by one or more of the plurality of sets of task processing instructions, which upon logging into the corresponding remote desktop protocol oriented process one or more of the work items as encoded in the task processing instructions.

These and additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically.

DETAILED DESCRIPTION

In the following detailed description, reference will be made to the accompanying drawings, in which identical functional elements are designated with like numerals. Elements designated with reference numbers ending in a suffix such as 0.1, 0.2, 0.3 are referred to collectively by employing the main reference number without the suffix. For example, 100 refers to topics 100.1, 100.2, 100.3 generally and collectively. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
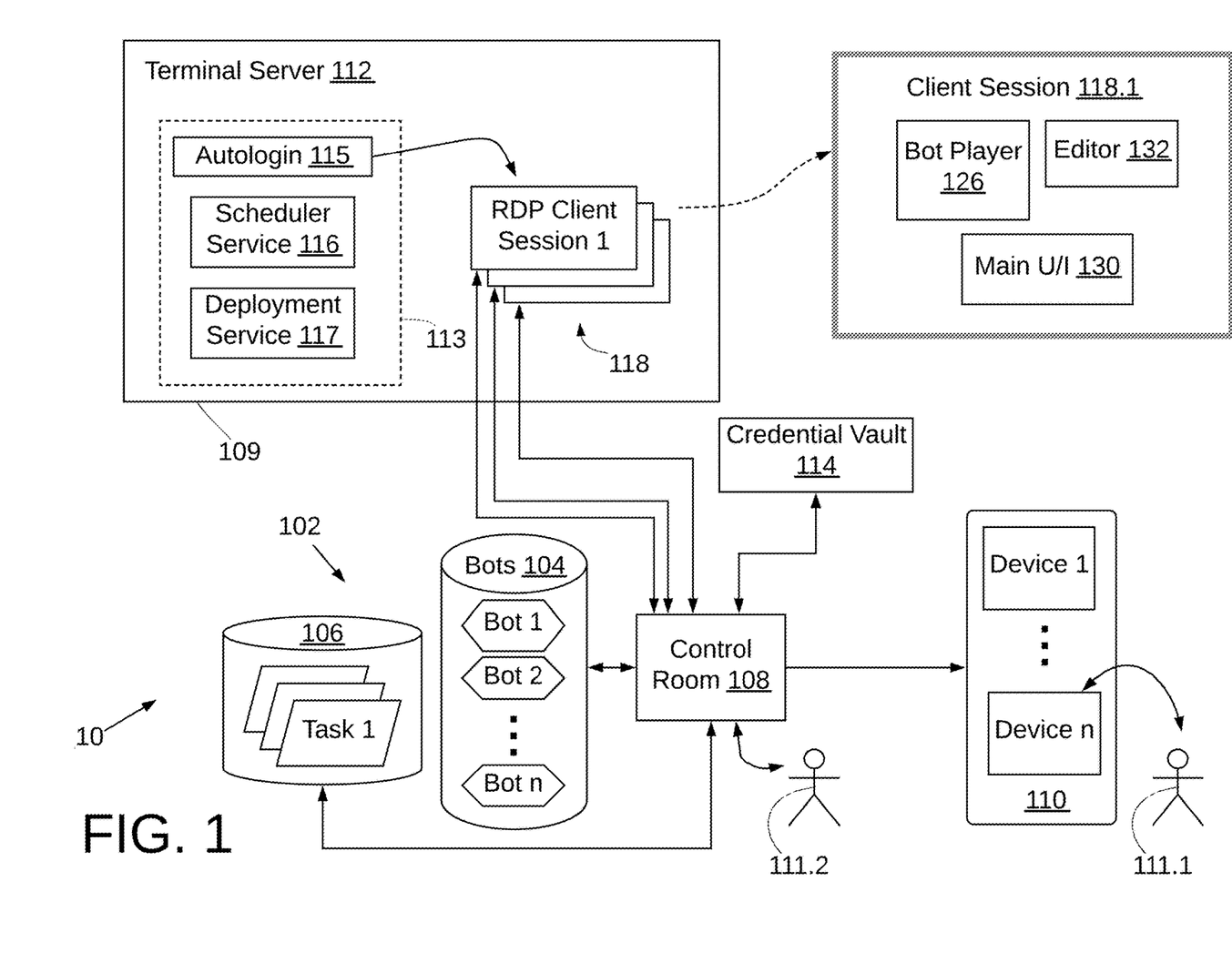
FIG. 1 is a high-level block diagram of an embodiment of an RPA system with automatic multi-user terminal server login.

In FIG. 1, the embodiments disclosed herein implement a robotic process automation system 10 that includes data storage, seen generally at 102 which stores a plurality of sets of task processing instructions 104. Each set of task processing instructions 104 implements a software robot, also referred to as a bot (seen as Bot 1, Bot 2, . . . , Bot n) which is operable to interact at a user level with one or more designated user level application programs (not shown). As used herein, the term "bot" is generally synonymous with the term software robot. In certain contexts, as will be apparent to those skilled in the art in view of the present disclosure, the term "bot runner" refers to a device (virtual or physical), having the necessary software capability (such as bot player 126), on which a bot will execute or is executing. The data storage 102 also stores a plurality of work items 106, where each work item 106 is stored for subsequent processing by executing a corresponding set of task processing instructions 104. A control room, seen generally at 108, is operatively coupled to the data storage 102 and is configured to execute instructions that when executed cause the RPA system 10 to respond to a request from a client device 110 that is issued by a user 111.1 to provide to the client device 110 the capability to perform an automation task to process a work item from the plurality of work items 106. Another user 111.2 may interact with the control room 108 to schedule automation tasks to be performed on one or more devices 110 as if the user were manually interacting with the necessary application program (s) and the operating system of the devices 110 to perform the tasks directly. The control room 108 in conjunction with credential vault 114 holds all software application license and user information. The control room 108 also tracks all bots that have been deployed and knows the status of all deployed bots.

Each client device 110 may take a variety of forms such as a physical machine, for example, a desktop computer, laptop computer or tablet. Each client device 110 may also be a virtual device such as provided by conventional virtualization software which permits multiple operating system sessions to be run on a single computer. Each client device 110 may have applications loaded thereon on local storage. In some cases, a client device may employ applications hosted by a server and accessed by the client device by way of a terminal server 112, which executes one or more user sessions seen generally at 118 on a server 109. A terminal server, such as terminal server 112, enables an organization to centrally host applications and resources and publish them to remote client devices, regardless of the location and platform of the end user device. This permits remote access of an application that may not otherwise be designed to be remotely accessed. Moreover, the central deployment of an application simplifies the installation and update of the application. This also provides cost benefits by reducing in some cases licensing costs of the application. An example of terminal server software is the Parallels Remote Application Server available from Parallels Inc. or Remote Desktop Services available from Microsoft Corporation. With such systems, the user interface is displayed from the server onto the client system and input from the client system is transmitted to the server, where execution of the application takes place.

In the embodiment shown in FIG. 1, the terminal server 112 may support multiple user sessions 118 (118.1 . . . 118.n) with each user session 118 being initiated by the autologin module 115 or by a device 110. In embodiments disclosed in further detail below, the system 10 may automatically deploy multiple sessions on the terminal server 112 without the involvement of any device 110, thereby minimizing the cost and complexity required to execute a terminal server session from a separate device 110.

The bots 104 execute on player 126, in a client session 118 to perform the functions encoded by the bot 104. The bot player 126 executes, or plays back, the sequence of instructions encoded in a bot. The sequence of instructions is captured by way of a recorder when a human performs those actions, or alternatively the instructions are explicitly coded into the bot. These instructions enable the bot player 126, to perform the same actions as a human would do in their absence. The instructions are composed of a command (action) followed by set of parameters, for example: Open Browser is a command, and a URL would be the parameter for it to launch the site. Additional aspects of operation of bots may be found in the following pending patent application, which refers to bots as automation profiles, System and Method for Compliance Based Automation, filed in the U.S. Patent Office on Jan. 6, 2016, and assigned application Ser. No. 14/988,877, which is hereby incorporated by reference in its entirety.

Some or all of the bots 104 may in certain embodiments be located remotely from the control room 108. Moreover, any of the devices 110 may also be located remotely from the control room 108. The bots 104 and the tasks 106 are shown in separate devices for purposes of illustration but they may be stored in separate or the same device(s), or across multiple devices. The control room 108 performs user management functions, source control of the bots 104, along with providing a dashboard that provides analytics and results of the bots 104, performs license management of software required by the bots 104 and manages overall execution and management of scripts, clients, roles, credentials, and security etc. The major functions performed by the control room 108 include: (i) a dashboard that provides a summary of registered/active users, tasks status, repository details, number of clients connected, number of scripts passed or failed recently, tasks that are scheduled to be executed and those that are in progress; (ii) user/role management—permits creation of different roles, such as bot creator, bot runner, admin, and custom roles, and activation, deactivation and modification of roles: (iii) repository management—to manage all scripts, tasks, workflows and reports etc.; (iv) operations management—permits checking status of tasks in progress and history of all tasks, and permits the administrator to stop/start execution of bots currently executing: (v) audit trail—logs creation of all actions performed in the control room; (vi) task scheduler—permits scheduling tasks which need to be executed on different clients at any particular time: (vii) credential management—permits password management; and (viii) security: management—permits rights management for all user roles. The control room 108 is shown generally for simplicity of explanation. Multiple instances of the control room 108 may be employed where large numbers of bots are deployed to provide for scalability of the RPA system 10.

The centralized credential vault (CV) 114 operates to securely store all credentials and provision them to bots on an on-demand basis. The CV preferably implements NIST controls IA-2 to uniquely identify and authenticate organizational users (or processes acting on behalf of organizational users). Since sensitive credentials need not be stored in bots or on bot runner systems, the CV facilitates a logical separation of credentials from the bots. CV variables are created from a control room and are instantly available to all the bot creators and bot runners registered with the respective CR. The CV adds flexibility and dynamic character to bots since only the credential references are present in the bots and not the credentials. When bots are moved from one environment to another environment, absolutely no change is needed in bots. Bots can seamlessly pick up the credential values applicable for the new environment from the CR of that environment. Additionally, the CR automatically stores configuration related sensitive data into the CV by default. Additional details of the credential vault 114 are described in pending U.S. patent application Ser. No. 15/957,917 entitled "ROBOTIC PROCESS AUTOMATION SYSTEM AND METHOD WITH SECURE CREDENTIAL VAULT" which is assigned to the assignee of the present application and which is hereby incorporated by reference in its entirety.

Figure 2A:
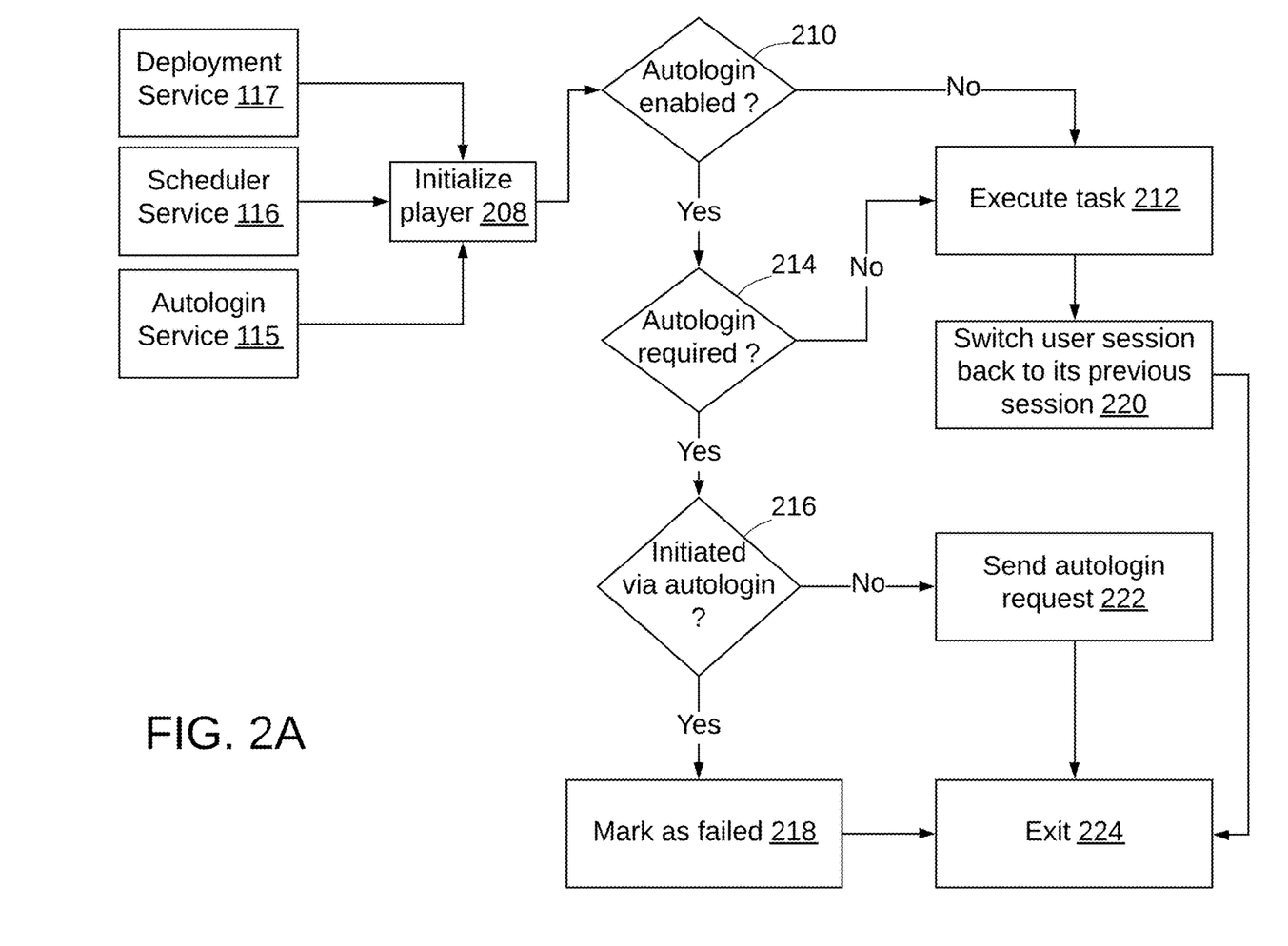
FIGS. 2A, 2B and 2C are flow diagrams illustrating high level operation of an embodiment of the system 10 to support automatic multi-user terminal server login.
Figure 2B:
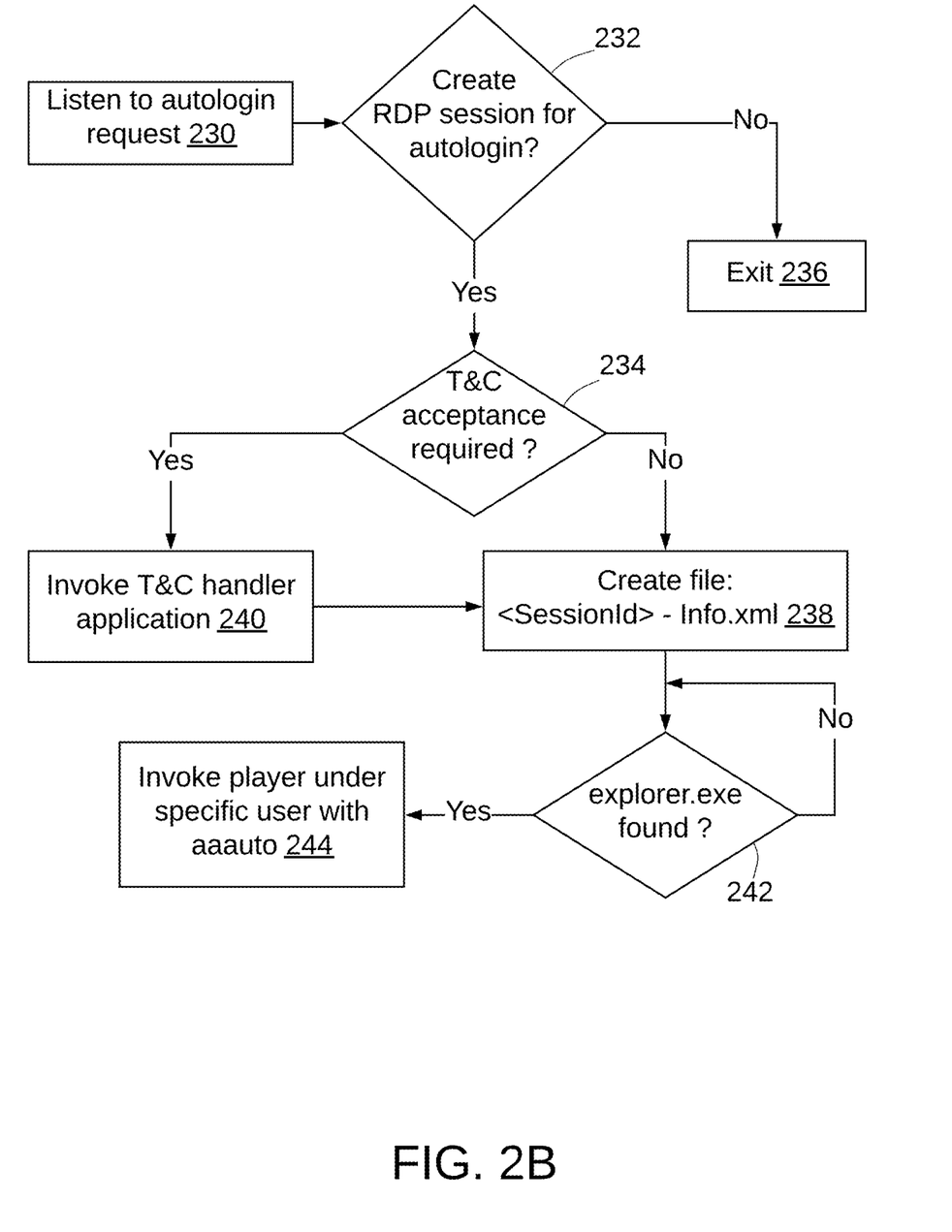
Figure 2C:
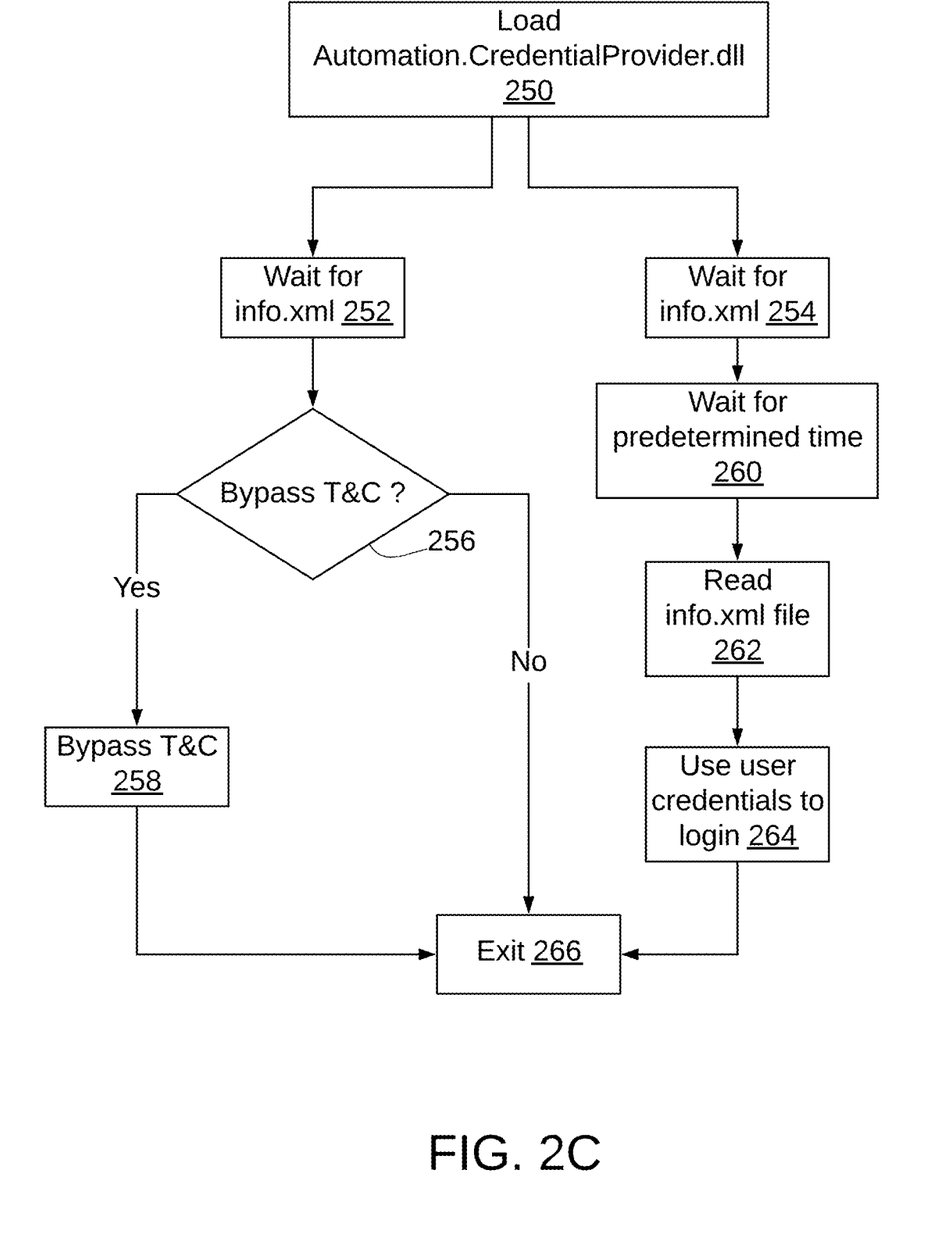

Autologin module 115 operates on the server 109 in a manner described in further detail in FIGS. 2A, 2B and 2C to cause the terminal server 112 to initiate RDP client sessions 118. Each of the sessions 118 initiated by the autologin module 115 takes the form of a Remote Desktop Protocol (RDP) session. The autologin module 115 scheduler service 116 and the deployment service 117 all run in a session 0 113, which for example in the Windows® operating system is the default session (often referred to as session 0) that is created by the operating system and in which only Windows services execute. In the session 0 GUI components (e.g. windows, dialog boxes, popups, etc.) of interactive Windows Services are displayed in complete isolation from a regularly logged in Windows desktop session. The scheduler service 116 operates as described in conjunction with FIG. 2A.

An RDP session 118, such as provided by Microsoft's Remote Desktop Services (formerly known as Terminal Services) provides functionality similar to a terminal-based, centralized host, or mainframe, environment in which multiple terminals connect to a host computer. Each terminal provides a conduit for input and output between a user and the host computer. A user can log on at a terminal, and then run applications on the host computer, accessing files, databases, network resources, and so on. Each terminal session is independent, with the host operating system managing conflicts between multiple users contending for shared resources. The primary difference between Remote Desktop Services and the traditional mainframe environment is that the dumb terminals in a mainframe environment only provide character-based input and output. A Remote Desktop Connection (RDC) client or emulator provides a complete graphical user interface including a Windows operating system desktop and support for a variety of input devices, such as a keyboard and mouse.

In the Remote Desktop Services environment, an application runs entirely on the Remote Desktop Session Host server 112. The RDC client, such as device 110, performs no local processing of application software. The server 112 transmits the graphical user interface to the client 110. The client 110 transmits the user's input back to the server 112. RDP server 112, as is conventional for RDP servers, uses its own video driver to render display output by constructing the rendering information into network packets by using RDP protocol and sending them over a network to the client device 110. On the client 110, the server 112 receives rendering data and interprets the packets, such as in a Windows installation into corresponding Microsoft Windows graphics device interface (GDI) API calls. For the input path, client 110 mouse and keyboard events are redirected from the client 110 to the server 112. On the server 112, the RDP protocol uses its own keyboard and mouse driver to receive these keyboard and mouse events. Certain environments, for security and other reasons, may block initiation of a console session for a user. The use of an RDP session as described herein complies with the security considerations adopted in such environments.

The foregoing description is provided in the context of a Windows environment. Additional details of RDP in the Windows environment may be found https//docs.microsoft-.com, and in particular in articles found in at the foregoing URL entitled Remote Desktop Sessions, May 30, 2018, Remote Desktop Protocol, May 30, 2018, and Remote Desktop Services, May 30, 2018. As will be appreciated by those skilled in the art in view of the present disclosure, similar functionality is available on other platforms such as Linux/Unix via rdesktop.

In the embodiments disclosed herein, automatic login (autologin) into a user session 118 may occur when the user session 118 is being hosted by the terminal server 112 and even in instances when multiple user sessions 118 are being hosted by the terminal server 112. This permits logging into a user session automatically to permit automatic deployment and execution of bots in unattended mode in a multi-user terminal server environment, such as for example, environments Windows Terminal Servers like Windows Server 2008, 2012, 2016 available from Microsoft Corporation. Moreover, certain organizations require a user, either before logging in or after logging in, to agree to certain terms and conditions of use before using the organization's computing systems. In such an instance, the embodiments disclosed herein permit automated acceptance of such terms and conditions to permit automated logging in and deployment of bots to interact with the organizations applications and perform other tasks on the organizations computing systems as would a human user. Such embodiments permit a user 111 to deploy one or more tasks on a client machine itself without affecting the control room 108.

As will be understood by those skilled in the art, computer systems typically are configured to require login by an identified user by way of a username and an associated password in order to use the computer system. Many computer systems permit multiple user accounts. Typically, in organizations, user account(s) for a computer system will be managed by a system administrator to ensure that only authorized user(s) are able to use the computer system in question. User A when logged into, for example, Computer X, will be provided with application(s), data and other system resources such as storage, communications, and peripherals (e.g. printer, scanner, fax) made available to user A by the system administrator. User B if provided with an account on Computer X when logged into Computer X will be provided with application(s), data and other system resources such as storage, communications, and peripherals (e.g. printer, scanner, fax) made available to user B by the system administrator, and such applications, data and other system resources may in some cases be same as User A, may in some cases be somewhat different and may possibly be entirely different. Typically, computer system operating systems are configured to cause input/output via the Graphical User Interface (GUI) to be disabled if there has been no input by the user, such as by way of the keyboard, pointing device, voice input, for a predetermined period of time. This state is referred herein to a "locked" state as the operating system does not permit any interaction via the GUI. To unlock the computer the user must typically revalidate themselves such as by entering their password or taking similar action (e.g. fingerprint or facial authentication). Computer systems may also be configured to logout a user after some period of time or after a period of inaction by the user. In such a case the user will typically need to reenter their password and possibly also their login identifier.

As noted above, certain systems may be configured to permit multiple user accounts. In some systems, multiple users may be concurrently logged into such systems and certain systems may support each concurrent logged in user with a separate GUI. Terminal servers as described above may also be configured to support multiple users to be logged in concurrently and such terminal servers may be configured as described above to require login, to lock the GUI after a predetermined amount of time of no input via the GUI and to require reentry of a password to unlock the user account and to logoff the user after a predetermined amount of time of inactivity.

The login module embodiments described herein permit autologin of multiple users into terminal servers that support concurrent multiple users and unlocking of locked sessions in the context of RPA to permit automated deployment of RPA in terminal server environments. Because RPA often requires human user type access to a GUI provided in a user account the embodiments described herein greatly facilitate larger scale RPA deployment in terminal server environments, which are preferred by many organizations for the reasons described else wear herein. The user sessions provided by the disclosed embodiments employ RDP sessions to permit multiple concurrent sessions in a terminal server. The login module embodiments disclosed herein may also be used in a single user environment in a session 0 where the user does not have administrator privileges. The disclosed embodiments may also logoff and disconnect from the associated RDP session.

Turning back to FIG. 1 autologin module 115 causes creation of one or more Remote Desktop Protocol (RDP) client sessions 118 for execution on server 109. Each of the RDP client sessions 118 operates in a manner as described above to act as a client, in a manner in which a device 110 would, to cause terminal server 112 to initiate an RDP server session, seen generally at 113, to provide a complete graphical user interface including an operating system desktop, such as Windows, and support for a variety of input devices, such as a keyboard and mouse to provide an environment in which application programs may execute as if executing on an independent device, such as a device 110. The autologin module 115, terminal server 112, RDP client sessions 118 and RDP server sessions 113 are shown executing on server 109. In FIG. 1 a single server is shown for simplicity of illustration. The implementation of server 109 may be performed by different conventional means including implementation on a single hardware device, or multiple hardware devices. As seen in FIG. 1, the server 109 with terminal server 112 may execute multiple RDP sessions, each of which may execute tasks implemented by one or more bots. Three sessions are shown for simplicity of illustration but the number of sessions existing and executing concurrently may be in the tens, hundreds or thousands. This advantageously simplifies the deployment of bots by centralizing the bots on a single server that may be centrally managed with software that is centrally located and managed. This further reduces complexity, improves reliability and can lower software licensing costs. Moreover, many organizations are familiar with deploying applications via a terminal server and are familiar with the requirements to securely deploy applications to protect financial data, health related data and other data that may be subject to regulatory requirements. Finally, the devices 110 are not required to execute bots, thereby freeing up such devices for other tasks.

FIGS. 2A, 2B and 2C are flow diagrams illustrating operation of an embodiment of the system 10 to support automatic multi-user terminal server login. In order to run a process without human intervention, a user 111 may schedule running of a bot from CR 108 upon logging into the CR 108. For example, user 111 may schedule via the CR 108 a particular process to be executed at a particular time on multiple devices. The CR 108 will at the scheduled time, send a command to the devices to run the scheduled bot(s) to perform the scheduled process. Turning to FIG. 2A, each session 113 has loaded thereon a deployment service 117, a scheduler service 204, and an autologin service 134. The deployment service 117 operates as a listener for requests from control room 108 and upon receipt of a command from the CR 108 to run a particular task the deployment service 117 initiates operation at 208 of player 126. Alternatively, initiation of a task may be initiated from the session 113 by way of scheduler service 204 which manages scheduling of tasks from the client side. The player 126 checks at 210 if autologin is enabled, and if so, then checks at 214 if autologin is required. It may be that autologin is not enabled. In that event, operations encoded by the bot in question will be executed at 212 until an operation requiring input from or output to the GUI is required. At that point the bot will fail as the GUI is not operational due to the screen being locked. Conversely, if no GUI related commad is require, the bot will succeed in its execution. At 210, it may be that the user is already logged in, in which case login is not required. If autologin is not required, the automation task required to be performed, such as processing a work item 106 with one or more bots 104, is executed, and upon completion of the automation task, the user session on the device is switched back to the previous session and the routine exits at 224.

If at 214 it is determined that autologin is required, then at 216 the login request is inspected to determine if it was initiated via autologin. Upon autologin a tag (designated as aaauto) is employed to identify the login as an autologin. The test at 216 is performed to avoid repeated requests for autologin if the request previously failed. Upon the first pass through 216 if autologin is required, then at 222 a request to autologin is sent to the terminal server 112 and the routine exits at 224. If at 214 it is determined that autologin is not required this is because the user is already logged in and the routine continues to 212 to execute the scheduled task and at 220 the user session is switched back to the previous session and the routine exits at 224.

Turning to FIG. 2B, at 230, upon receipt of an autologin request, a check is performed at 232 to determine if an RDP session by way of autologin has been enabled. If not then the routine exits at 236. If so, then at 234 a test is performed to determine if T&Cs are required to be accepted. If so then at 240, a T&C handler application is invoked to accept the displayed terms and conditions and operation 238 is performed. If T&Cs are determined at 234 to not be required then at 238 a login information file (info.xml) which contains the credentials required to login, as obtained from CV 114 is created. Identifying the T&C screen requires knowledge of an identifier of the T&C screen. The T&C handler application causes the identifier for the particular operating system in question to be retrieved from storage and compared with an identifier for each screen presented by the operating system during the login sequence to identify the T&C screen.

At 242 a test is performed to determine if the login operation has completed to create a user session. This test is performed by checking for the existence of a necessary file that is always created upon login to the target operating system. The existence of the necessary file is used as a signal that the necessary login operation has completed, and the desired user session has been initiated. Specifically, in the case of the Windows® operating system, the test is performed by checking if a process "Explorer.exe" is running under the target user. The autologin service 115 will create a file that is read by the credential provider, as described below. The autologin service 115 will continue until a timeout duration. In the Windows® operating system, as seen at 242, the necessary file that is used is the explorer.exe file that is always executed upon logging into the Windows® operating system. The Windows® OS is shown here as an example because of its ubiquity in corporate computing environments. The existence of other files may be employed when the target system employs a different operating system. The test at 242 is repeated until the existence of the necessary file is identified. Then at 244 the player 126 is invoked with the user credentials as specified by the aauto parameter.

Turning to FIG. 2C, at 250, the credential provider dynamic link library (Automation.CredentialProvider.dll) responds to a request from the autologin service 206 by searching for a particular file (info.xml) in a particular folder. Two separate processing threads are executing, and they continue upon receipt of the info.xml file. Different operating systems may have different sequences in which the T&C screen is presented to the user. In some operating systems, the T&C screen is presented prior to login, and in other operating systems, the T&C screen is presented after login. The test at 256 is performed to determine if the T&C screen has already been presented and addressed, prior to login. If not, then it is addressed at 258. Concurrently with operation 256/258, at 254, once the info.xml file is received, the routine waits a predetermined amount of time, to allow operations 256/258 to be performed as necessary to address the T&C screen. The info.xml file is then read at 262 and the credentials are used at 264 to programmatically perform the login operation. The login routine then exits at 266.

The embodiments herein can be implemented in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

Figure 3:
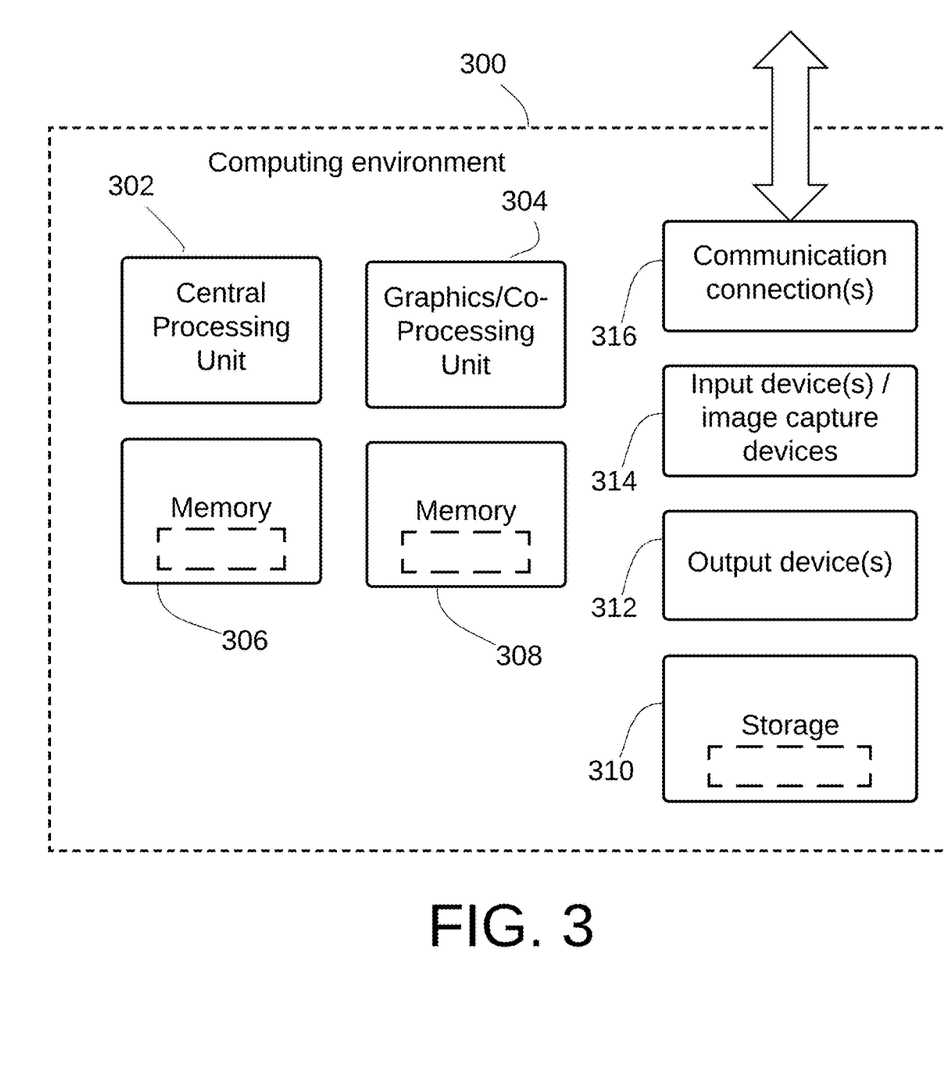
FIG. 3 illustrates a block diagram of hardware that may be employed in an implementation of the RPA systems disclosed herein.

FIG. 3 illustrates a block diagram of hardware that may be employed in an implementation of the RPA system as disclosed herein. FIG. 3 depicts a generalized example of a suitable general-purpose computing system 300 in which the described innovations may be implemented in order to improve the processing speed and efficiency with which the computing system 300 operates to perform the functions disclosed herein. With reference to FIG. 3 the computing system 300 includes one or more processing units 302, 304 and memory 306, 308. The processing units 302, 306 execute computer-executable instructions. A processing unit can be a general-purpose central processing unit (CPU), processor in an application-specific integrated circuit (ASIC) or any other type of processor. The tangible memory 306, 308 may be volatile memory (e.g., registers, cache, RAM), non-volatile memory (e.g., ROM, EEPROM, flash memory, etc.), or some combination of the two, accessible by the processing unit(s). The hardware components in FIG. 3 may be standard hardware components, or alternatively, some embodiments may employ specialized hardware components to further increase the operating efficiency and speed with which the system 100 operates. The various components of computing system 300 may be rearranged in various embodiments, and some embodiments may not require nor include all of the above components, while other embodiments may include additional components, such as specialized processors and additional memory.

Computing system 300 may have additional features such as for example, storage 310, one or more input devices 314, one or more output devices 312, and one or more communication connections 316. An interconnection mechanism (not shown) such as a bus, controller, or network interconnects the components of the computing system 300. Typically, operating system software (not shown) provides an operating system for other software executing in the computing system 300, and coordinates activities of the components of the computing system 300.

The tangible storage 310 may be removable or non-removable, and includes magnetic disks, magnetic tapes or cassettes, CD-ROMs, DVDs, or any other medium which can be used to store information in a non-transitory way, and which can be accessed within the computing system 300. The storage 310 stores instructions for the software implementing one or more innovations described herein.

The input device(s) 314 may be a touch input device such as a keyboard, mouse, pen, or trackball, a voice input device, a scanning device, or another device that provides input to the computing system 300. For video encoding, the input device(s) 314 may be a camera, video card, TV tuner card, or similar device that accepts video input in analog or digital form, or a CD-ROM or CD-RW that reads video samples into the computing system 300. The output device(s) 312 may be a display, printer, speaker, CD-writer, or another device that provides output from the computing system 300.

The communication connection(s) 316 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A robotic process automation system comprising:
    data storage for storing,
        a plurality of bots, each bot to interact at a user level with one or more designated user level application programs; and
        a plurality of work items, each work item stored for subsequent processing by executing a corresponding bot;
    a first server processor operatively coupled to the data storage and configured to execute instructions that when executed cause the first server processor to respond to a request to perform an automation task to automatically process without human user input, a work item from the plurality of work items, by,
        transmitting a first request to an autologin program executing on a second server processor device to initiate a first remote desktop protocol oriented process within an operating system executing on the second server, the first remote desktop protocol oriented process providing a graphical user interface to an authorized user;
        transmitting a second request to the autologin program executing on the second server processor device to initiate a second remote desktop protocol oriented process, that executes concurrently with the first remote desktop protocol oriented process, within the operating system executing on the second server, the second remote desktop protocol oriented process providing a graphical user interface to an authorized user;
    wherein credentials for the authorized user of the first remote desktop protocol oriented process and for the authorized user of the second remote desktop protocol oriented process are provided by one or more of the plurality of bots, which upon logging into the corresponding remote desktop protocol oriented process, process one or more of the work items as encoded in bots.

2. The robotic process automation system of claim 1 further comprising a scheduler, executing on the second server processor, that generates a third request to the autologin program to initiate a third remote desktop protocol oriented process, that executes concurrently with the first remote desktop protocol oriented process, within the operating system executing on the second server, the third remote desktop protocol oriented process providing a graphical user interface to an authorized user;
    wherein credentials for the authorized user of the third remote desktop protocol oriented process are provided by one or more of the plurality of bots, which, upon logging into the third remote desktop protocol oriented process, process one or more of the work items as encoded in the bots.

3. The robotic process automation system of claim 1 wherein the autologin program comprises a terms and conditions handler that during login to the corresponding desktop protocol oriented process, provides an input required by a terms and conditions screen, that specifies terms and conditions of use of the second server, to use the second server.

4. The robotic process automation system of claim 3 wherein the autologin program executes in a session of the operating system executing on the second server in which graphical user interface components of interactive services of the operating system are displayed in isolation from operating system sessions associated with user activity.

5. The robotic process automation system of claim 1 further comprising a deployment service, executing on the second server processor, that operates as a listener for requests from the first server processor and upon receipt of a command from the first server processor to run a particular task initiates operation of a fourth remote desktop protocol oriented process, that executes concurrently with the first remote desktop protocol oriented process, within the operating system executing on the second server, the fourth remote desktop protocol oriented process providing a graphical user interface to an authorized user;
    wherein credentials for the authorized user of the fourth remote desktop protocol oriented process are provided by one or more of the plurality of bots, which, upon logging into the fourth remote desktop protocol oriented process, process one or more of the work items as encoded in the bots.

6. The robotic process automation system of claim 1 further comprising:
    a scheduler, executing on the second server processor, that generates a third request to the autologin program to initiate a third remote desktop protocol oriented process, that executes concurrently with the first remote desktop protocol oriented process, within the operating system executing on the second server, the third remote desktop protocol oriented process providing a graphical user interface to an authorized user; and
    a deployment service, executing on the second server processor, that operates as a listener for requests from the first server processor and upon receipt of a command from the first server processor to run a particular task initiates operation of a fourth remote desktop protocol oriented process, that executes concurrently with the first remote desktop protocol oriented process, within the operating system executing on the second server, the fourth remote desktop protocol oriented process providing a graphical user interface to an authorized user;

wherein credentials for the authorized user of the third remote desktop protocol oriented process and for the authorized user of the fourth remote desktop protocol oriented process are provided by one or more of the plurality of bots, which, upon logging into the third remote desktop protocol oriented process and the fourth remote desktop protocol oriented process, process one or more of the work items as encoded in the bots.

7. A robotic process automation system comprising:

data storage for storing,
- a plurality of bots, each bot to interact at a user level with one or more designated user level application programs; and
- a plurality of work items, each work item stored for subsequent processing by executing a corresponding bot;

a server processor operatively coupled to the data storage and configured to execute instructions that when executed cause the server processor to respond to a request to perform an automation task to automatically process without human user input, a work item from the plurality of work items, by transmitting a request to a second device to initiate a first user process within an operating system executing on the second device;

the second device executing the first user process as one of a plurality of user processes on the operating system, wherein each of the plurality of user processes on the operating system is initiated under control of a terminal server, the second device responding to the request to initiate the first user process within the operating system executing on the second device by transmitting a request to a credential authority for user credentials associated with a user under whose identity the first user process is to be executed; and the terminal server providing to the user process graphical output by one or more user level application programs specified by the automation task, that are executed remotely from the second device, and are used by the automation task executing under the user credentials associated with the user, and wherein the terminal server further provides to the one or more user level application programs, input provided by the automation task.

8. The robotic process automation system of claim 7 wherein the second device comprises a client service that operates to listen for a request from the server processor to login the user under whose identity the first user process is to be executed, the client service responding to the request from the server processor by initiating an automatic login service to login the user.

9. The robotic process automation system of claim 7 wherein the second device comprises a scheduler service that operates to initiate login of the user under whose identity the first user process is to be executed in accordance with a predetermined schedule stored on the second device.

10. The robotic process automation system of claim 8 wherein the automatic login service executes in a session of the operating system executing on the terminal server in which graphical user interface components of interactive services of an operating system executing on the terminal server are displayed in isolation from operating system sessions on the terminal server associated with user activity.

11. The robotic process automation system of claim 8 further comprising a deployment service, executing on the second device, that operates as a listener for requests from the server processor and upon receipt of a command from the server processor to run a particular task initiates operation of a second user process, that executes concurrently with the first user process, within the operating system executing on the second device, the second user process providing a graphical user interface to an authorized user;

wherein credentials for the authorized user of the second user process are provided by one or more of the plurality of bots, which, upon logging into the second user process, process one or more of the work items as encoded in the bots.

12. The robotic process automation system of claim 7 further comprising:

a scheduler, executing on the second device, that generates a third request to the autologin program to initiate a third user process, that executes concurrently with the first user process, within the operating system executing on the second device, the third user process providing a graphical user interface to an authorized user; and a deployment service, executing on the second device, that operates as a listener for requests from the server processor and upon receipt of a command from the server processor to run a particular task initiates operation of a fourth user process, that executes concurrently with the first user process, within the operating system executing on the second device, the fourth user process providing a graphical user interface to an authorized user;

wherein credentials for the authorized user of the third user process and for the authorized user of the fourth user process are provided by one or more of the plurality of bots, which, upon logging into the third user process and the fourth user process, process one or more of the work items as encoded in the bots.

13. A first computer system associated with a tangible storage medium, the tangible storage medium having stored thereupon one or more program modules comprising computer-executable instructions for execution on a second computer system, the first computer system responding to a request for the program modules by providing the program modules to the second computer system, the program modules causing the second computer system to implement a robotic process automation system that has associated therewith data storage for storing a plurality of bots, each bot to interact at a user level with one or more designated user level application programs, the data storage further storing a plurality of work items, each work item stored for subsequent processing by executing a corresponding bot;

the robotic processing system responding to a request to perform an automation task to automatically process without human user input, a work item from the plurality of work items, by, transmitting a first request to an autologin program executing on a second server processor device to initiate a first remote desktop protocol oriented process within an operating system executing on the second server, the first remote desktop protocol oriented process providing a graphical user interface to an authorized user;

transmitting a second request to the autologin program executing on the second server processor device to initiate a second remote desktop protocol oriented process, that executes concurrently with the first remote desktop protocol oriented process, within the operating system executing on the second server, the second remote desktop protocol oriented process providing a graphical user interface to an authorized user;

wherein credentials for the authorized user of the first remote desktop protocol oriented process and for the authorized user of the second remote desktop protocol oriented process are provided by one or more of the bots, which upon logging into the corresponding remote desktop protocol oriented process, process one or more of the work items as encoded in the bots.

14. The first computer system of claim 13 wherein the robotic process automation system further comprises a scheduler, executing on the second server processor, that generates a third request to the autologin program to initiate a third remote desktop protocol oriented process, that executes concurrently with the first remote desktop protocol oriented process, within the operating system executing on the second server processor, the third remote desktop protocol oriented process providing a graphical user interface to an authorized user;

wherein credentials for the authorized user of the third remote desktop protocol oriented process are provided by one or more of the bots, which upon logging into the third remote desktop protocol oriented process, process one or more of the work items as encoded in the bots.

15. The first computer system of claim 13 wherein the autologin program comprises a terms and conditions handler that during login to the corresponding desktop protocol oriented process, provides an input required by a terms and conditions screen, that specifies terms and conditions of use of the second server, to use the second server.

16. The robotic process automation system of claim 15 wherein the autologin program executes in a session of the operating system executing on the second server in which graphical user interface components of interactive services of the operating system are displayed in isolation from operating system sessions associated with user activity.

17. The robotic process automation system of claim 13 further comprising a deployment service, executing on the second server processor device, that operates as a listener for requests from the second computer system and upon receipt of a command from the second computer system to run a particular task initiates operation of a fourth remote desktop protocol oriented process, that executes concurrently with the first remote desktop protocol oriented process, within the operating system executing on the second server, the fourth remote desktop protocol oriented process providing a graphical user interface to an authorized user; wherein credentials for the authorized user of the fourth remote desktop protocol oriented process are provided by one or more of the plurality of bots, which, upon logging into the fourth remote desktop protocol oriented process, process one or more of the work items as encoded in the bots.

18. The robotic process automation system of claim 13 further comprising:

a scheduler, executing on the second server processor, that generates a third request to the autologin program to initiate a third remote desktop protocol oriented process, that executes concurrently with the first remote desktop protocol oriented process, within the operating system executing on the second server, the third remote desktop protocol oriented process providing a graphical user interface to an authorized user; and a deployment service, executing on the second server processor, that operates as a listener for requests from the second computer system and upon receipt of a command from the second computer system to run a particular task initiates operation of a fourth remote desktop protocol oriented process, that executes concurrently with the first remote desktop protocol oriented process, within the operating system executing on the second server, the fourth remote desktop protocol oriented process providing a graphical user interface to an authorized user;

wherein credentials for the authorized user of the third remote desktop protocol oriented process and for the authorized user of the fourth remote desktop protocol oriented process are provided by one or more of the plurality of bots, which, upon logging into the third remote desktop protocol oriented process and the fourth remote desktop protocol oriented process, process one or more of the work items as encoded in the bots.

\* \* \* \* \*